United States Patent
Voigt et al.

(10) Patent No.: US 9,332,539 B2
(45) Date of Patent: May 3, 2016

(54) METHOD FOR PREVENTING PACKET CHANNEL TIMING OUT AND SYSTEM

(75) Inventors: Lotta Voigt, Bromma (SE); Fredrik Persson, Märsta (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 142 days.

(21) Appl. No.: 14/343,887

(22) PCT Filed: Oct. 14, 2011

(86) PCT No.: PCT/IB2011/002440
§ 371 (c)(1),
(2), (4) Date: Mar. 10, 2014

(87) PCT Pub. No.: WO2013/054152
PCT Pub. Date: Apr. 18, 2013

(65) Prior Publication Data
US 2014/0226634 A1    Aug. 14, 2014

(51) Int. Cl.
| | |
|---|---|
| H04B 7/216 | (2006.01) |
| H04W 72/04 | (2009.01) |
| H04W 76/04 | (2009.01) |
| H04W 76/06 | (2009.01) |
| H04L 29/08 | (2006.01) |
| H04B 7/26 | (2006.01) |

(52) U.S. Cl.
CPC .......... *H04W 72/042* (2013.01); *H04B 7/2628* (2013.01); *H04L 67/145* (2013.01); *H04L 67/2842* (2013.01); *H04W 76/045* (2013.01); *H04W 76/068* (2013.01)

(58) Field of Classification Search
USPC ......... 370/335, 311, 338, 328, 329, 389, 351, 370/412; 455/422.1
See application file for complete search history.

(56) References Cited

U.S. PATENT DOCUMENTS

| | | |
|---|---|---|
| 2006/0026286 A1 | 2/2006 | Lei et al. |
| 2009/0257378 A1* | 10/2009 | Cuny .................... H04W 76/02 370/328 |

FOREIGN PATENT DOCUMENTS

WO    2011/100518 A2    8/2011

OTHER PUBLICATIONS

International Search Report issued in corresponding International application No. PCT/IB2011/002440, date of mailing May 23, 2012.

* cited by examiner

*Primary Examiner* — Chi H Pham
*Assistant Examiner* — Alexander O Boakye
(74) *Attorney, Agent, or Firm* — Patent Portfolio Builders PLLC (57) ABSTRACT

A communication system, cache, computer readable medium and method for preventing a packet channel in the communication network to time out. The method includes sending data from a cache (18) to a user terminal (16*d*), wherein the cache (18) is located at an interface device (12*a-c*); determining that the data is sent to the user terminal (16*d*) from the cache (18) without passing a core network (14); and generating and sending a dummy message (20) through the core network (14) to a device (22) having an internet protocol, IP, address.

22 Claims, 6 Drawing Sheets

METHOD FOR PREVENTING PACKET CHANNEL TIMING OUT AND SYSTEM

TECHNICAL FIELD

The present invention generally relates to systems, software and methods and, more particularly, to mechanisms and techniques for preventing a packet channel in a communication network to time out.

BACKGROUND

During the past years, computing devices such as computers, mobile phones, game consoles, personal digital assistants, etc., have evolved so much that they are able to receive a large variety of content. Most of the content, e.g., media files, arrives at the computing device through a communication network. The content may be stored in caches distributed at different locations in the communication network for improvising the content delivery.

Traditionally, a cache was located upstream a core network of the communication network, usually outside the network. More recently, to improve the content access of the end user, caches are located inside the communication network, sometimes downstream the core network. Thus, when retrieving the content from a cache located inside the communication network, the data stream provided to a user terminal might not pass through interfaces upstream of the cache. In this case, the data stream starts at the cache and goes through a downstream interface to the client, by-passing the core network. This process is advantageous as it may save internet transit and transmission costs for all interfaces above the cache.

However, the following problem is generated by this approach. For example, in the Third Generation Partnership Project (3GPP) mobile networks a Packet Data Protocol (PDP) Context is set up between the core network and the user terminal for data transmission. However, an operator requirement to the 3GPP standard is that a timer should be present in the core network and this timer is configured to time out upon inactivity, i.e., if no data is transmitted in the PDP context and to release the PDP context.

Thus, if no data is sent through a connection to the user terminal, the connection may time out and the connection may be taken down. One example is the above noted PDP context in a Wideband Code Division Multiple Access (WCDMA) network. Another example is the Enhanced Packet Service (EPS) bearers in a Long Term Evolution (LTE) network. Other networks suffer from the same problem but for simplicity, the following discussion refers only to WCDMA and LTE networks.

If no data is passing through the core network in WCDMA or LTE, the inactivity timers will trigger the PDP context/EPS bearer to be released. When the content is retrieved by the user terminal from a cache located below the core network, e.g., the Radio Network Subsystem (RNS) in WCDMA or eNB in LTE, that content will not pass through the core network. If no data passes through the core network within a configured time limit, the PDP context/EPS bearer are released. The probability that the user terminal sends/receives other traffic that could pass through the core network decreases with increased size of the objects that are retrieved from the cache.

When the core network inactivity timer expires, a Radio Access Network (RAN) in the WCDMA is ordered to release the PDP context. According to the 3GPP standard, there is no possibility for the RAN to refuse a PDP context release. If the core network is unaware of the cache in RAN, which is the most probable case, there are no existing means to stop the core network from releasing the PDP context/EPS bearer.

One approach to solve this problem is to send keep alive signals from an application running on the user terminal. However, for this case, the user terminal is unaware of the fact that it is accessing a cache downstream the core network instead of an internet server upstream of the core network. Thus, the user terminal is unaware of the need to send keep alive signals during a session in which the content is received from a cache downstream of the core network.

Further exacerbating this problem is the fact that characteristics of inactivity timers in the core networks vary among operators, for example, from 5 to 15 minutes. This means that an ongoing video session of more than 5 to 15 minutes, played from the cache to the user terminal, would be interrupted when the PDP context is released. Depending on the client application, the video would either be restarted from the beginning or not at all. In the best case, there will be an interruption in the video stream for several seconds, while the PDP context is re-established.

Alternatively, the connection between the user terminal and the cache may also be dropped and the content manually restarted from the beginning. This is user terminal dependent. However, interrupting the content transmission from the cache to the user terminal is annoying for the user, especially if the content is a video file.

Accordingly, it would be desirable to provide devices, systems and methods that avoid the afore-described problems and drawbacks.

SUMMARY

Assets as, for example, content are desired to be provided to the users from locations that are most suitable to the users. A suitable location may be a location that is closest to the user. In this way, receiving the content from a location closest to the user frees bandwidth in the network and/or reduces a time for receiving the asset. Thus, a network operator provides caches at these locations that are closer to the users. However, these locations may trick the core network of the communication network into believing that there is not data traffic from and to the user terminal. Thus, a packet channel between the user terminal and the core network is timed out, determining an interruption of the download process of desired content. Novel embodiments discussed next overcome some of these problems.

According to one exemplary embodiment, there is a method for preventing a packet channel in a communication network to time out. The communication network has an interface device connected to a core network and the interface device is configured to connect a user terminal to the core network. The method includes a step of sending data from a cache to the user terminal, wherein the cache is located at the interface device. The method further includes a step of determining that the data is sent to the user terminal from the cache without passing the core network; and a step of generating and sending a dummy message through the core network to a device having an internet protocol, IP, address, to prevent a release of the packet channel.

According to another exemplary embodiment, there is a communication network that is configured to time out a packet channel if no data is transmitted along the packet channel. The communication network includes a core network configured to establish the packet channel between a user terminal and the core network; an interface device located between the user terminal and the core network and configured to connect the user terminal to the core network.

The network also includes a cache located at the interface device and configured to provide content to the user terminal. The network further includes an inactivity timer configured to trigger a release of the packet channel when no data is transmitted between the core network and the user terminal. The interface device is configured to send a dummy message past the core network to a device having an internet protocol, IP, address when data is sent from the cache to the user terminal so that the inactivity timer does not release the packet channel.

According to another exemplary embodiment, there is a computer readable medium including computer executable instructions, wherein the instructions, when executed by a processor, implement a method for preventing a packet channel in a communication network to time out, the communication network having an interface device connected to a core network and the interface device is configured to connect a user terminal to the core network. The method includes the steps discussed above with regard to the method embodiment.

According to still another exemplary embodiment, there is a cache for storing content and for preventing a packet channel in a communication network to be released. The cache includes a processor configured to, determine when data is sent from the cache to a user terminal connected to an interface device of the communication network; receive an indication from the communication network that the data is sent to the user terminal from the cache without passing a core network of the communication network; and generate and send a dummy message through the core network to a device having an internet protocol, IP, address or instruct the interface device to generate and send the dummy message.

Thus, it is an object to overcome some of the deficiencies discussed in the previous section and to provide a mechanism that prevents the core network to time out a packet channel even when no data is passed through the core network to the user terminal. One or more of the independent claims advantageously provides such a mechanism for preventing a packet channel to time out when data is by-passing the core network. This mechanism will ensure that the content to be delivered to the user is not interrupted or dropped because of the timing out of the channel packet, thus, resulting in a pleasant experience for the user and a quicker delivery of the content.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of WCDMA, LTE and GSM networks. However, the embodiments to be discussed next are not limited to these communication networks and may be applied to other types of communication networks.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
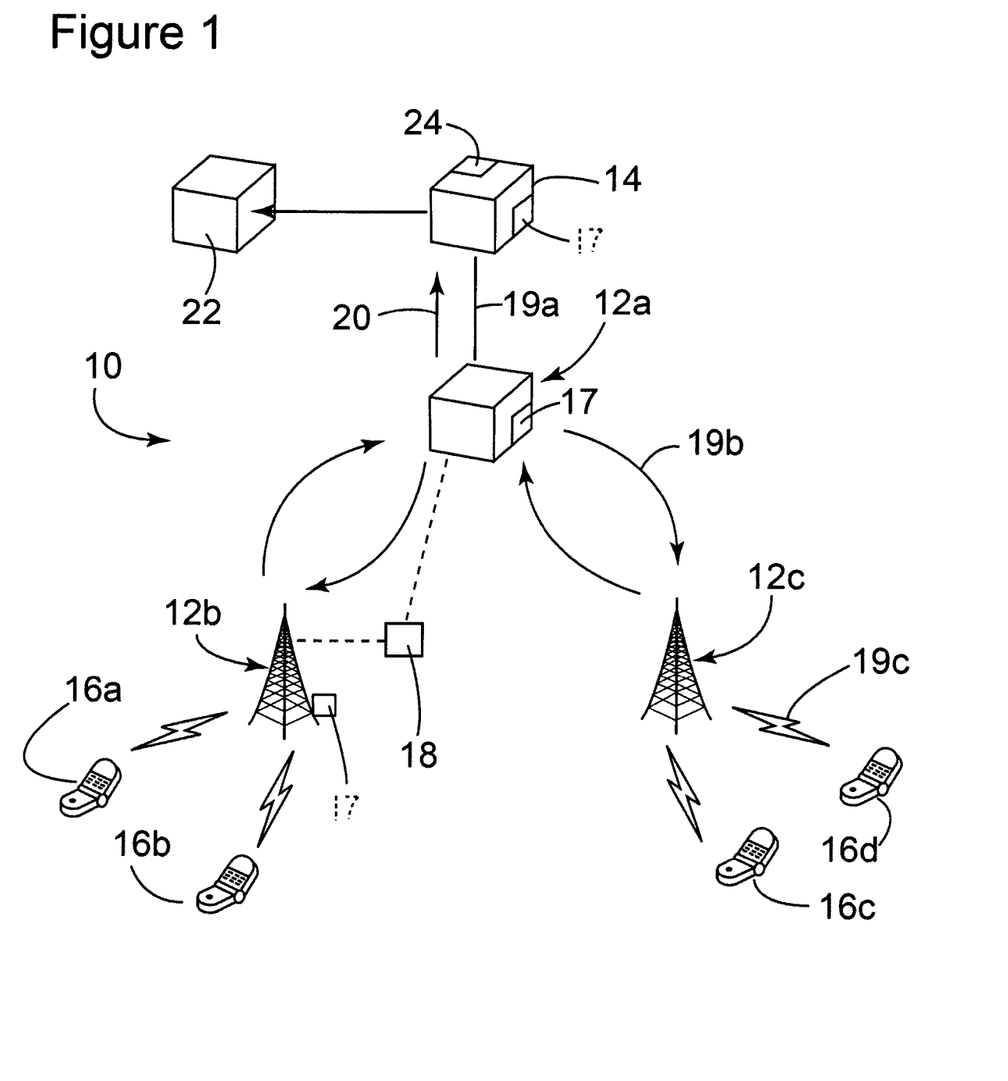
FIG. 1 is a schematic diagram of a communication network having a cache and a mechanism for preventing a packet channel to time out according to an exemplary embodiment.

According to an exemplary embodiment, there is a novel mechanism for preventing a packet channel in a communication network to time out when no data from a user terminal passes a core network. This mechanism is illustrated in FIG. 1, in which the communication network 10 has an interface device 12a-c connected to a core network 14 and the interface device 12a-c is configured to connect user terminals 16a-d to the core network 14. The interface device 12a-c may include a control device 12a and base stations 12b-c. The mechanism 17 may be implemented at any element of the interface device 12a-c or in the core network 14. In one application, the mechanism 17 may be distributed at all these elements of the network. The mechanism 17 may be implemented as hardware, software or a combination of the two.

A functionality of the mechanism 17 monitors when data (e.g., content) is sent from a cache 18 to the user terminal 16a. Alternatively, the mechanism 17 is informed by the communication network when data is transmitted from the cache to the user terminal. It is noted that the data transmission from the cache 18 to a user terminal 16d happens along a packet channel 19a-c already established between the user terminal 16d and the core network 14. In the context of the LTE network, the packet channel is an EPS bearer while in the context of the WCDMA the packet channel is a PDP context. The cache 18 may be located at the interface device 12a-c. In one application, the mechanism 17 may be located in the cache 18.

The functionality also includes a step of determining that the data is sent to the user terminal from the cache without passing the core network. Based on this information, the functionality generates and sends a dummy message 20 through the core network 14 to a device 22 having an internet protocol (IP) address. The device 22 may be, for example, a router. The device 22 may be located outside the communication network 10. Other devices having IP addresses may be used instead of the router. FIG. 1 also shows an inactivity timer 24 configured to time out the packet channel 19a-c when no data from the user terminal 16d (or any other user terminal) passes the core network 14. Although the figure shows the packet channel between the core network and the user terminal 16d, those skilled in the art would recognize that any user terminal 16a-d may be in this position.

Thus, when the functionality of the mechanism 17 determines that traffic data is exchanged between the cache 18 and the user terminal 16d, without passing the core network 14, the functionality generates the dummy message 20 and sends it through the core network 14 to prevent the release of the packet channel.

The novel mechanism discussed above for preventing a packet channel in a communication network to time out may be applied to various communication networks. FIG. 1 illustrates a generic communication network. However, for a better understanding of the novel mechanism and its location for various networks, it is now discussed with regard to the WCDMA, LTE and GSM networks. Those skilled in the art, after reading the present disclosure, would understand how to implement the same mechanism in other communication networks with appropriate modifications. For that reason, the novel mechanism is not discussed in this application with regard to all existing communication networks.

Figure 2:
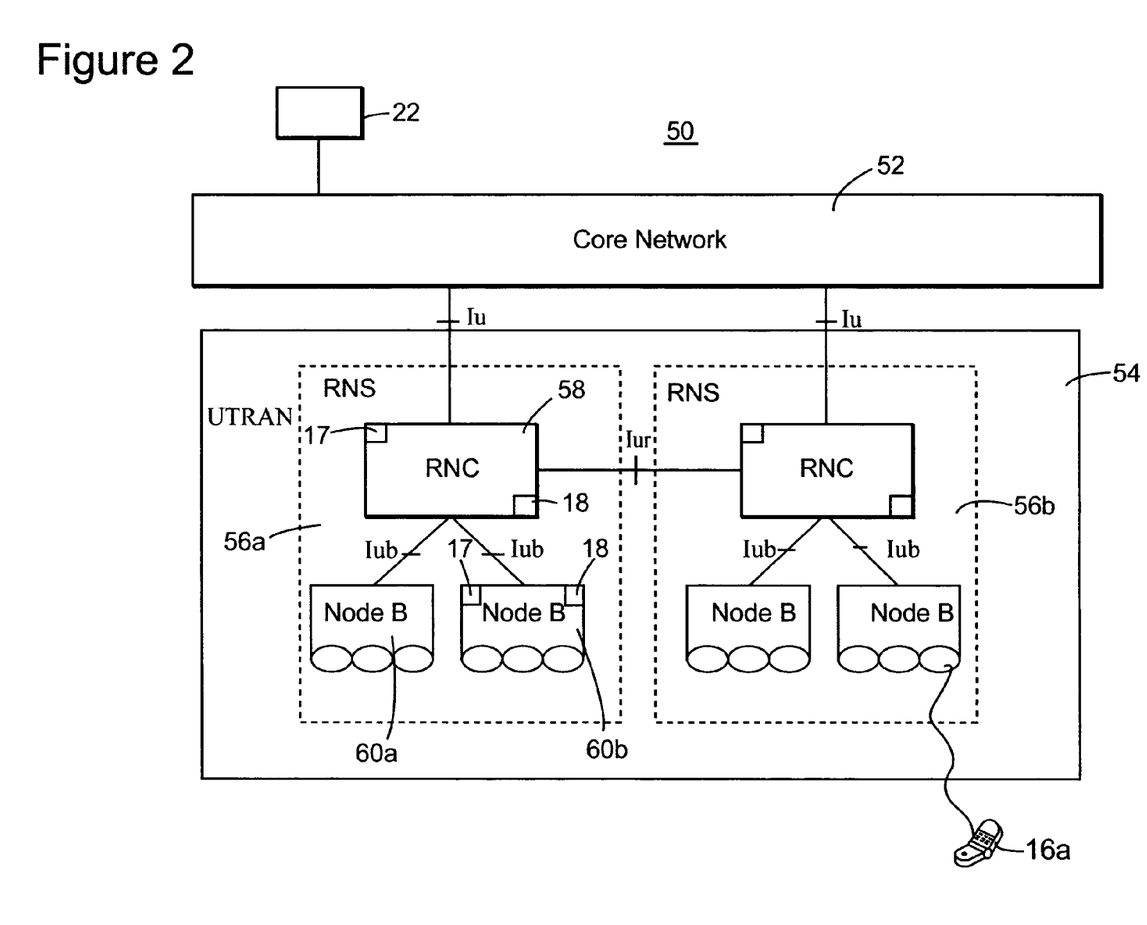
FIG. 2 is a schematic diagram of a WCDMA network having a cache and a mechanism for preventing a packet channel to time out according to an exemplary embodiment.

According to an exemplary embodiment illustrated in FIG. 2, a WCDMA network may be modified to implement the novel mechanism discussed above. FIG. 2 shows the WCDMA network 50 having a core network 52 and a RAN 54. The RAN 54 includes one or more radio network subsystems (RNS) 56a-b. Each RNS includes a radio network controller (RNC) 58 and one or more base stations NodeB 60a-b connected and controlled by the RNC 58.

The cache 18 may be located at the RNC 58 or at the NodeB 60a-b or at both locations. The novel mechanism 17 may also be provided at one of these locations. A user terminal is configured to communicate with one of the NodeB 60a-b. Thus, for this communication network, the interface device includes at least one of the RNC 58 or the NodeB 60a-b.

The novel mechanism 17 may be configured to send the dummy message, e.g., a ping, at regular time intervals to a dummy router 22 on the other side of the core network 52. This ping will have the same effect as a keep alive message sent from the client application, which is keeping the connection between the user terminal and the core network open. It is noted that for a WCDMA network, the packet channel is the PDP context.

Figure 3:
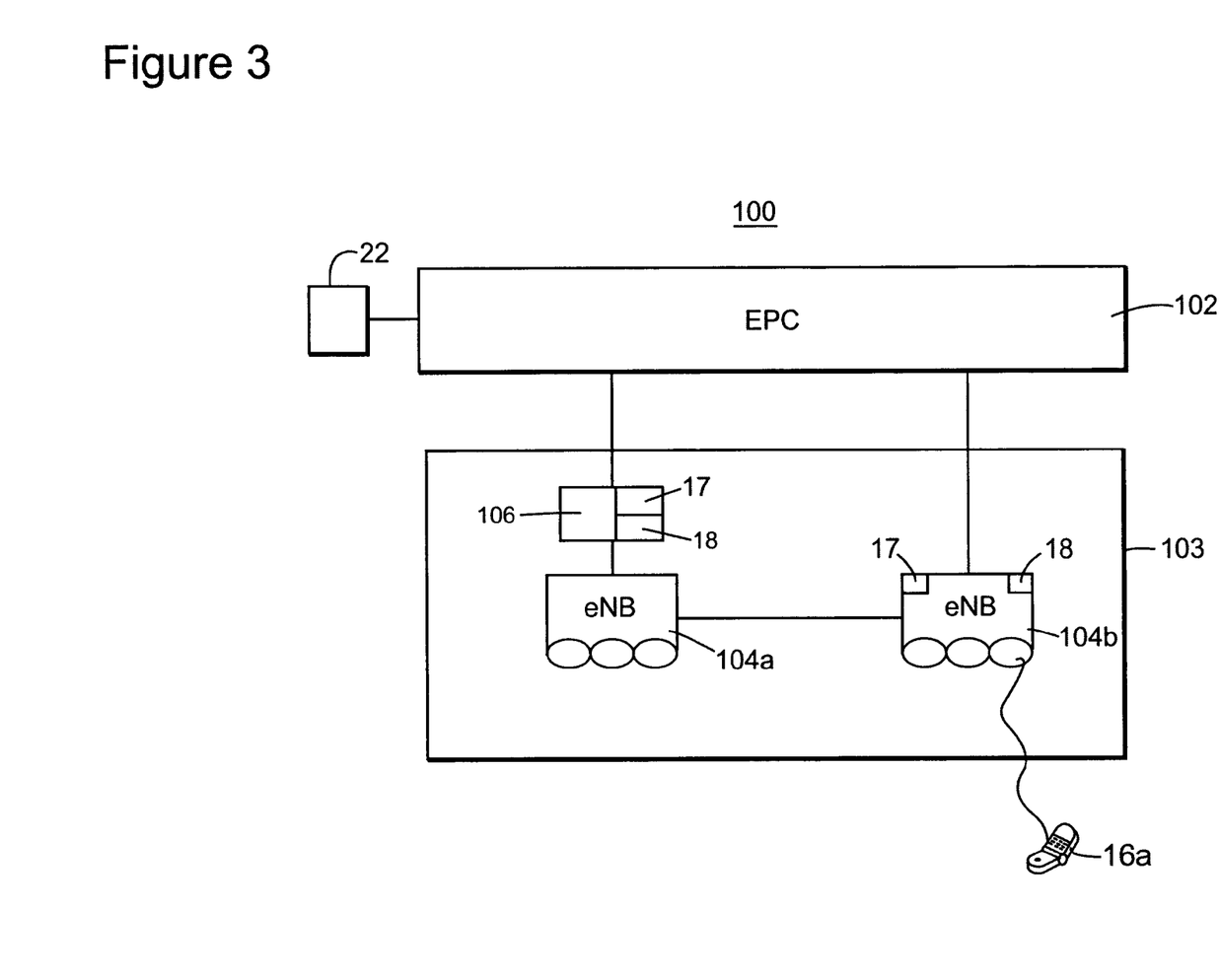
FIG. 3 is a schematic diagram of an LTE network having a cache and a mechanism for preventing a packet channel to time out according to an exemplary embodiment.

An LTE communication network is illustrated in FIG. 3. The LTE network 100 has a core network (evolved packet core, EPC) 102 connected to a RAN 103. The RAN 103 may include one or more base stations eNB 104a-b and one or more nodes 106 (for simplicity, a single node is shown) located between the core network 102 and one or more of the base stations 104a-b. The core network 102 may include a mobility management entity (MME), a serving gateway (SGW), and a packet data network gateway (PGW). A user terminal 16a connects to the base station eNB. The cache 18 and the mechanism 17 may be located at any of the base stations eNB 104a-b, at any of the nodes 106, or at each of them. The interface device of FIG. 1 corresponds to the RAN 103. The packet channel is the EPS bearer for the LTE network.

Figure 4:
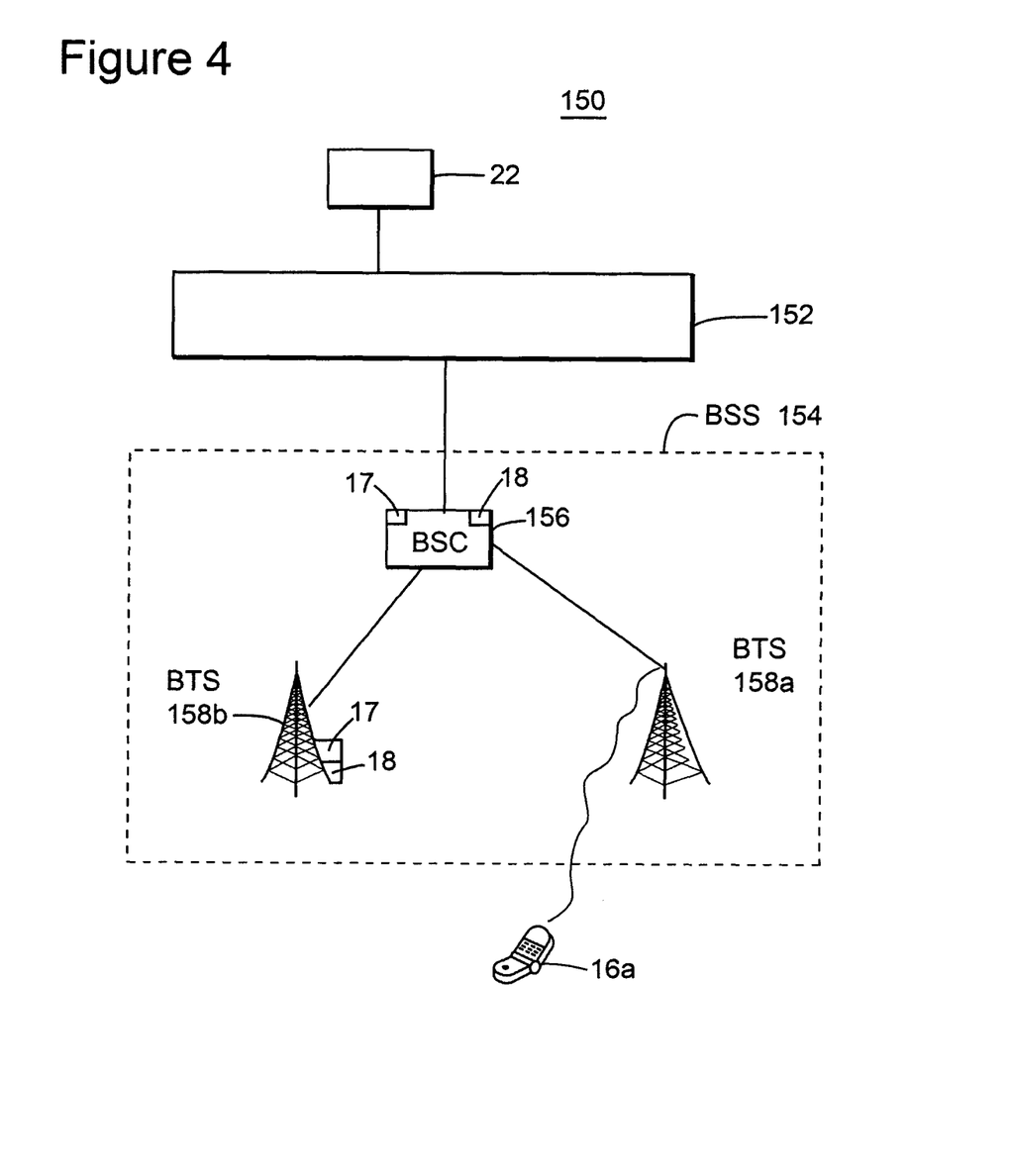
FIG. 4 is a schematic diagram of a GSM network having a cache and a mechanism for preventing a packet channel to time out according to an exemplary embodiment.

A GSM network is illustrated in FIG. 4. The network 150 has a core network 152 that is connected to a base station subsystem (BSS) 154. The BSS 154 includes a base station controller BSC 156 and one or more base transceiver stations BTS 158a-b. A user terminal 16a connects to a base station 158a. The cache 18 and the mechanism 17 may be located at the BSC 156 or at one or more of the base stations BTS 158a-b or at a combination of these elements. Thus, in this communication network, the interface device includes the BSS 154.

The novel mechanism 17 may be implemented in other communication networks similar to the configurations shown in FIGS. 2-4. In one application, the novel mechanism may be implemented in the cache 18. Thus, the functionality of the mechanism 17 may monitor when content is downloaded to the user terminal. When this action is detected, the functionality in the cache 18 may generate and send the dummy message through the core network to the dummy router 22.

Figure 5:
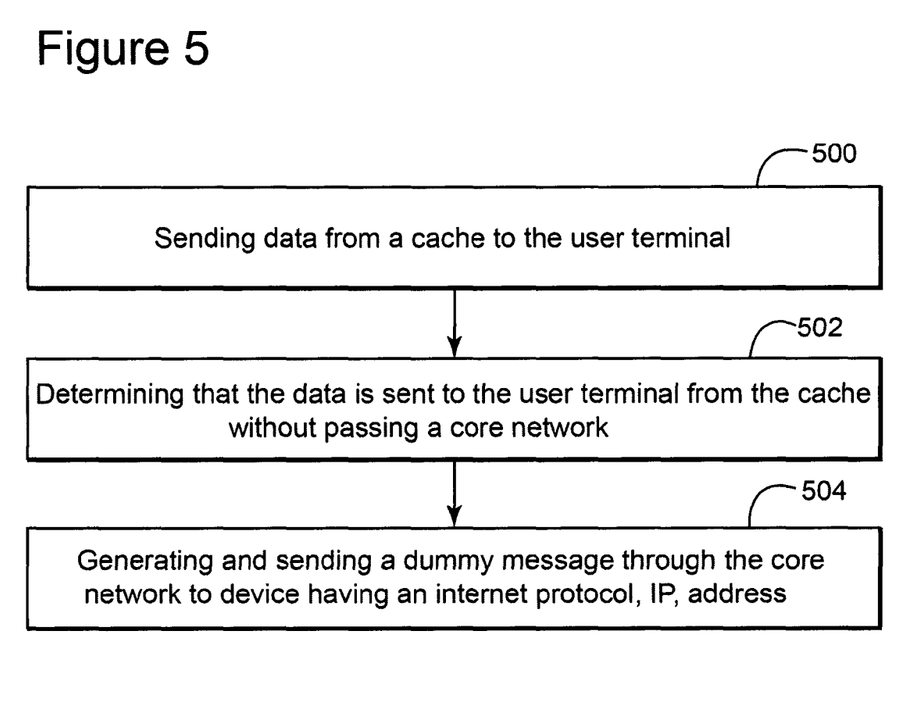
FIG. 5 is a flowchart of a method for preventing a packet channel to time out when there is no traffic between a user terminal and a core network according to an exemplary embodiment.

The novel functionality discussed above may be implemented as a method in the communication network. According to an exemplary embodiment illustrated in FIG. 5, there is a method for preventing a packet channel (19a-c) in a communication network (10) to time out. The communication network (10) has an interface device (12a-c) connected to a core network (14) and the interface device (12a-c) is configured to connect a user terminal (16d) to the core network (14). The method includes a step 500 of sending data from a cache (18) to the user terminal (16d), wherein the cache (18) is located at the interface device (12a-c); a step 502 of determining that the data is sent to the user terminal (16d) from the cache (18) without passing the core network (14); and a step 504 of generating and sending a dummy message (20) through the core network (14) to a device (22) having an IP address.

Figure 6:
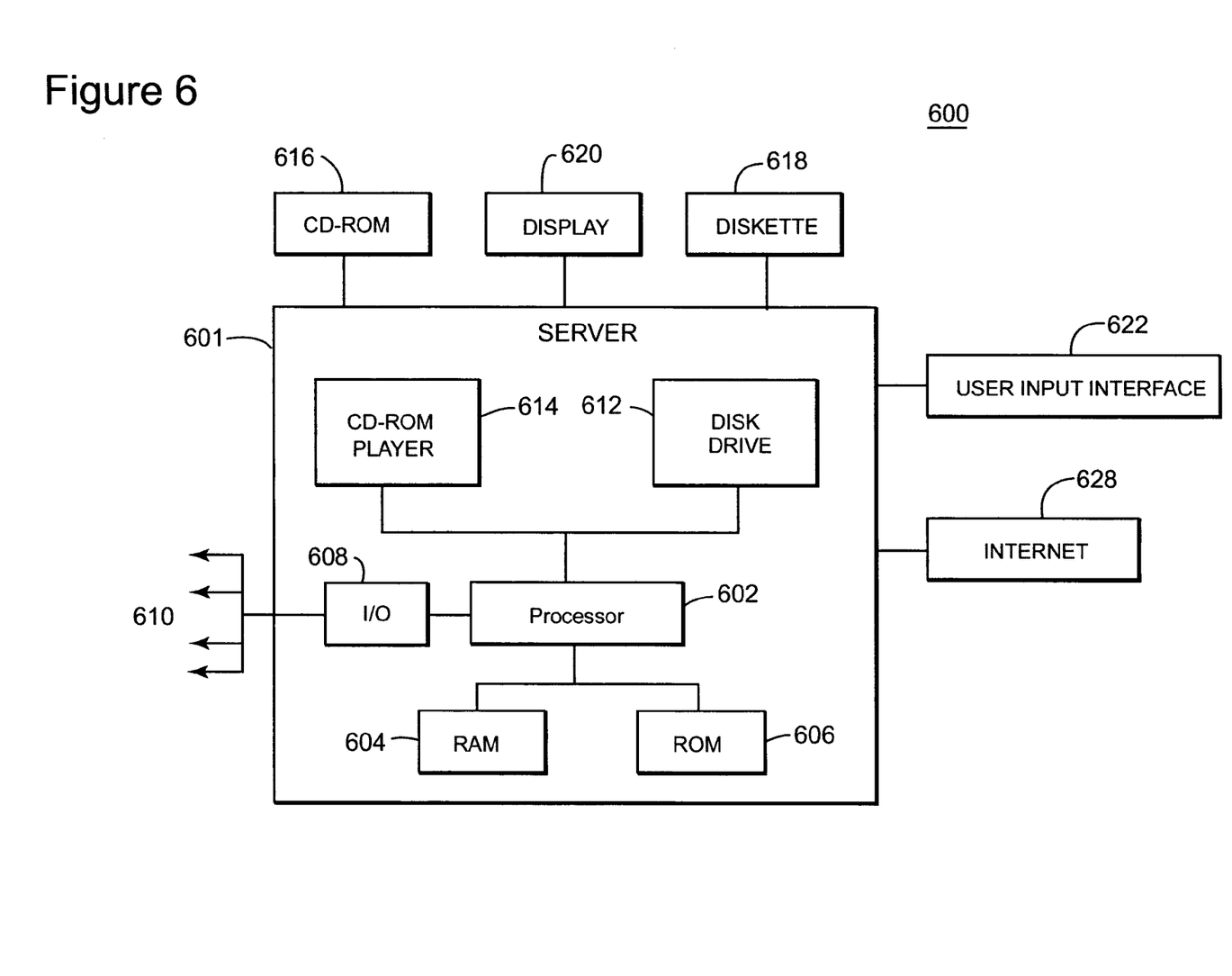
FIG. 6 is a schematic diagram of a mechanism or cache.

For purposes of illustration and not of limitation, an example of a representative mechanism and/or cache capable of carrying out operations in accordance with the exemplary embodiments is illustrated in FIG. 6. Hardware, firmware, software or a combination thereof may be used to perform the various steps and operations described herein.

The exemplary mechanism/cache 600 suitable for performing the activities described in the exemplary embodiments may include a server 601. Such a server 601 may include a central processor (CPU) 602 coupled to a random access memory (RAM) 604 and to a read-only memory (ROM) 606. The ROM 606 may also be other types of storage media to store programs, such as programmable ROM (PROM), erasable PROM (EPROM), etc. The processor 602 may communicate with other internal and external components through input/output (I/O) circuitry 608 and bussing 610, to provide control signals and the like. The processor 602 carries out a variety of functions as is known in the art, as dictated by software and/or firmware instructions.

The server 601 may also include one or more data storage devices, including hard and floppy disk drives 612, CD-ROM drives 614, and other hardware capable of reading and/or storing information such as DVD, etc. In one embodiment, software for carrying out the above discussed steps may be stored and distributed on a CD-ROM 616, diskette 618 or other form of media capable of portably storing information. These storage media may be inserted into, and read by, devices such as the CD-ROM drive 614, the disk drive 612, etc. The server 601 may be coupled to a display 620, which may be any type of known display or presentation screen, such as LCD displays, plasma display, cathode ray tubes (CRT), etc. A user input interface 622 is provided, including one or more user interface mechanisms such as a mouse, keyboard, microphone, touch pad, touch screen, voice-recognition system, etc.

The server 601 may be coupled to other computing devices, such as the landline and/or wireless terminals, via a network. The server may be part of a larger network configuration as in a global area network (GAN) such as the Internet 628, which allows ultimate connection to the various landline and/or mobile client/watcher devices.

The disclosed exemplary embodiments provide a cache, a method and a computer program product for preventing a packet channel to time out when a user terminal receives content from a cache located downstream from a core network of a communication network. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for preventing a packet channel in a communication network to time out, the communication network having an interface device connected to a core network and the interface device is configured to connect a user terminal to the core network, the method comprising:
   sending data from a cache of the interface device to the user terminal, wherein the cache is located at the interface device;
   determining, by the interface device, that the data is sent to the user terminal from the cache without passing the core network; and
   generating and sending a dummy message through the core network to a device having an internet protocol, IP, address when data is sent from the cache to the user terminal so that an inactivity timer does not release the packet channel.

2. The method of claim 1, further comprising:
   sending the dummy message to the device having the IP address as long as data is sent from the cache to the user terminal.

3. The method of claim 1, further comprising:
   terminating sending the dummy message when the all the data has been sent from the cache to the user terminal.

4. The method of claim 1, wherein the communication network is a Wideband Code Division Multiple Access, and the interface device includes at least one radio network subsystem, RNS.

5. The method of claim 4, wherein the RNS includes a radio network controller, RNC, and plural radio base stations connected to the RNC, and the cache is located in the RNC or in one or more radio base stations.

6. The method of claim 1, wherein the communication network is a global system for mobile communications, GSM, and the interface device is a base station subsystem, BSS.

7. The method of claim 6, wherein the BSS includes a base station controller, BSC, and plural base transceiver stations, BTSs, connected to the BSS, and the cache is located in the BSC or in one or more BTSs.

8. The method of claim 1, wherein the communication network is a long term evolution, LTE, and the interface device is a radio base station, eNB, or a node located between the eNB and the core network, and the cache is located in the eNB or in the node.

9. The method of claim 1, further comprising:
   sending at regular time intervals the dummy message.

10. The method of claim 1, further comprising:
    establishing the packet channel between the user terminal and the core network prior to sending the data from the cache to the user terminal.

11. The method of claim 10, further comprising:
    releasing the packet channel when a timer of the core network determines that there is no data being transmitted to the user terminal for a predetermined amount of time.

12. The method of claim 11, wherein the releasing is prevented when the dummy message travels past the core network.

13. The method of claim 1, wherein the device having the IP address is a router.

14. A communication network that is configured to time out a packet channel if no data is transmitted along the packet channel, the communication network comprising:
    a core network configured to establish the packet channel between a user terminal and the core network;
    an interface device located between the user terminal and the core network and configured to connect the user terminal to the core network;
    a cache located at the interface device and configured to provide content to the user terminal; and
    an inactivity timer configured to trigger a release of the packet channel when no data is transmitted between the core network and the user terminal,
    wherein the interface device is configured to send a dummy message past the core network to a device having an internet protocol, IP, address when data is sent from the cache to the user terminal so that the inactivity timer does not release the packet channel.

15. The communication network of claim 14, wherein the interface device is configured to send the dummy message to the device having the IP address as long as the data is sent from the cache to the user terminal.

16. The communication network of claim 14, wherein the communication network is a Wideband Code Division Multiple Access, the interface device includes at least one radio network subsystem, RNS, the RNS includes a radio network controller, RNC, and plural radio base stations connected to the RNC, and the cache is located in the RNC or in one or more radio base stations.

17. The communication system of claim 14, wherein the communication network is a global system for mobile communications, GSM, the interface device is a base station subsystem, BSS, the BSS includes a base station controller, BSC, and plural base transceiver stations, BTSs, connected to the BSS, and the cache is located in the BSC or in one or more BTSs.

18. The communication system of claim 14, wherein the communication network is a long term evolution, LTE, the interface device is a radio base station, eNB, or a node located between the eNB and the core network, and the cache is located in the eNB or in the node.

19. The communication system of claim 14, wherein the core network is configured to establish the packet channel between the user terminal and the core network prior to sending the data from the cache to the user terminal.

20. The communication system of claim 14, wherein the device having the IP address is a router.

21. A non-transitory computer readable medium including computer executable instructions, wherein the instructions, when executed by a processor, implement a method for preventing a packet channel in a communication network to time out, the communication network having an interface device connected to a core network and the interface device is configured to connect a user terminal to the core network, the method comprising:
    sending data from a cache of the interface device to the user terminal, wherein the cache is located at the interface device;
    determining, by the interface device, that the data is sent to the user terminal from the cache without passing the core network; and
    generating and sending, by the interface device, a dummy message through the core network to a device having an internet protocol, IP, address when data is sent from the cache to the user terminal so that an inactivity timer does not release the packet channel.

22. A cache for storing content and for preventing a packet channel in a communication network to be released, the cache comprising:
    a processor configured to,
    determine when data is sent from the cache to a user terminal connected to an interface device of the communication network;
    receive an indication from the communication network that the data is sent to the user terminal from the cache without passing a core network of the communication network; and
    generate and send a dummy message through the core network to a device having an internet protocol, IP, address or instruct the interface device to generate and send the dummy message when data is sent from the cache to the user terminal so that an inactivity timer does not release the packet channel.

* * * * *

UNITED STATES PATENT AND TRADEMARK OFFICE
CERTIFICATE OF CORRECTION

PATENT NO. : 9,332,539 B2  Page 1 of 1
APPLICATION NO. : 14/343887
DATED : May 3, 2016
INVENTOR(S) : Voigt et al.

It is certified that error appears in the above-identified patent and that said Letters Patent is hereby corrected as shown below:

In the specification

In Column 6, Line 29, delete "central processor (CPU)" and insert -- central processing unit (CPU) --, therefor.

In the claims

In Column 7, Line 58, in Claim 3, delete "when the" and insert -- when --, therefor.

In Column 8, Line 59, in Claim 17, delete "system" and insert -- network --, therefor.

In Column 8, Line 66, in Claim 18, delete "system" and insert -- network --, therefor.

In Column 9, Line 4, in Claim 19, delete "system" and insert -- network --, therefor.

In Column 9, Line 8, in Claim 20, delete "system" and insert -- network --, therefor.

Signed and Sealed this
Twelfth Day of July, 2016

Michelle K. Lee
*Director of the United States Patent and Trademark Office*